Nov. 15, 1955     W. McGUIRE     2,723,822
BRACKETS FOR ELECTRIC METER BOXES
Filed May 18, 1953
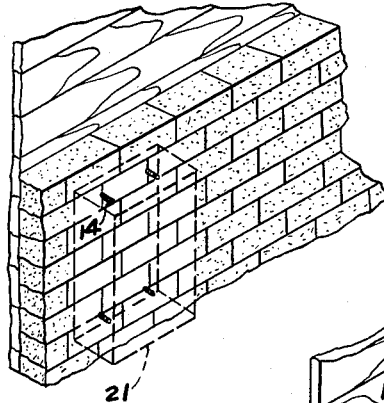
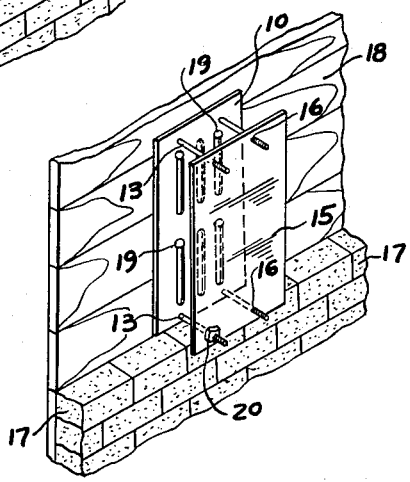
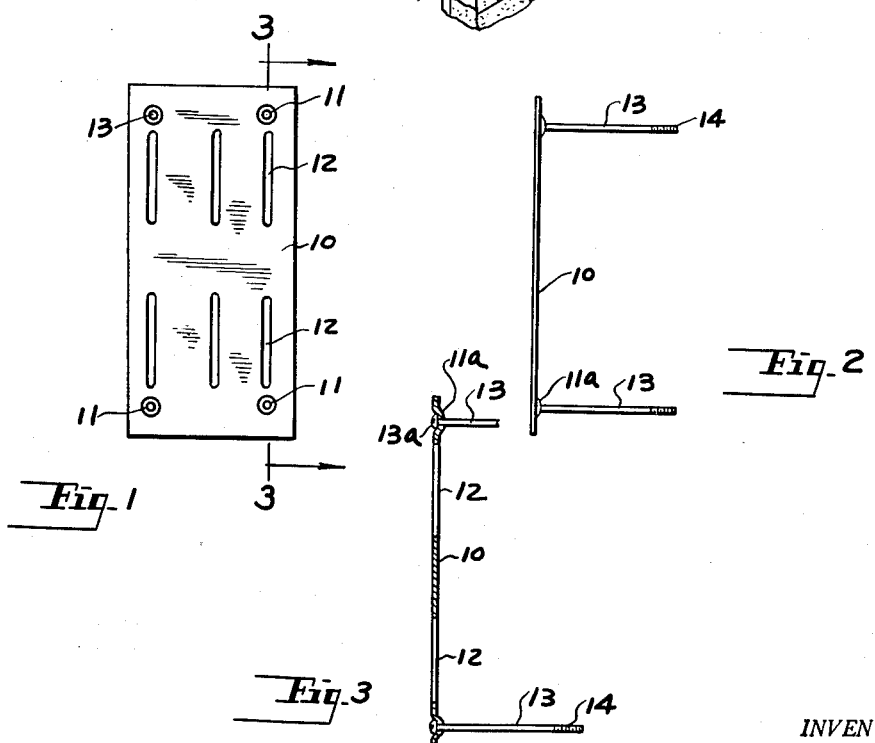
INVENTOR.
WILLIAM McGUIRE.
BY Louis Chayka
ATTORNEY.

United States Patent Office 2,723,822
Patented Nov. 15, 1955

2,723,822
BRACKETS FOR ELECTRIC METER BOXES
William McGuire, Van Dyke, Mich.

Application May 18, 1953, Serial No. 355,774

2 Claims. (Cl. 248—205)

My improvement pertains to a bracket which may be built into the wall of a building and which is designed to eliminate the need of drilling holes for insertion thereinto of bolts upon which an electric meter box may be mounted upon completion of the wall.

An object of my improvement is to provide a bracket which during the construction of the wall may be affixed to parts of the wall already in place in such a manner that said bracket may be shifted vertically for an adjustable relation to other wall parts still under construction. A further object of my improvement is to provide a bracket including a plurality of bolts for support of an electric meter box or some similar device, the bracket being adapted to be associated, during the construction of the wall, with means for keeping the bolts in a vertical and horizontal alinement with each other.

These and other advantages of my bracket will now be described by me with reference to the accompanying drawings in which:

Fig. 1 is a plan elevational view of a plate forming a part of my bracket;

Fig. 2 is a side elevational view of my bracket, the view including a plurality of bolts forming a part thereof;

Fig. 3 is a sectional view on line 3—3 of Fig. 2;

Fig. 4 is a perspective view of my bracket as mounted upon a partly constructed wall, the wall being composed of a wood structure and a veneer layer of bricks;

Fig. 5 is a perspective view of a part of a completed wall the view including an electric meter box as mounted upon said wall by means of my bracket.

Similar numerals refer to similar parts throughout the several views.

The bracket consists of a rectangular metal plate 10, the plate being provided with a hole 11 in each corner for a mounting of the plate in a vertical position, and with a plurality of oblong slots 12 in a spaced relation to each other. As shown in the drawings, the plate contains a number of such slots in its upper portion and a similar number of slots in its lower portion, while the midportion of the plate is solid. The slots are in a parallel relation to each other and to the sides of the plate itself. Inserted into each hole, is a bolt 13, the head 13a of the bolt being adapted to fit into a cup-like depression 11a about each of said holes in order that the heads of the bolts may be flush with the surface of the body of the plate.

The plate with said bolts is mounted on the wood structure of the wall, such as boards 18, the heads of the bolts being on the side of the plate which faces said boards. The mounting may be effected by means of nails 19 to be driven into boards 18 at a height at which, approximately, an electric meter will be mounted on the wall after the wall had been finished. The nails, it will be understood, are to be driven into the boards through the slots 12 at the very top of said slots.

It will be noted that the bolts will project from plate 10 transversely over the layer of bricks which form the customary veneer part of the wall. As it is important that the bolts be properly alined with respect to each other and that they be kept in a true horizontal position, a retaining plate 15 is used for that purpose. The retaining plate is also provided with holes, one in each corner, the holes being spaced from each other horizontally and vertically in the manner of spacing in plate 10. The retaining plate is kept in place, in a parallel relation to plate 10, by means of said bolts which fit into holes 16 in the retaining plate as shown in Fig. 4. To prevent displacement of the retaining plate, nuts 20 may be applied to the threaded ends 14 of the bolts till the brick portion of the wall has been completed.

Should it happen that in the course of the laying of bricks, the bolts would be in the way of a brick, the whole assembly including plate 10, the bolts and the retaining plate, may be shifted upwardly upon the retaining nails 19, so that the lower bolts 13 would be allowed to rest upon the brick or bricks disposed immediately thereunder.

It is advisable that the length of the plate 10 be in some fixed relation to the thickness of the bricks and the thickness of mortar interposed therebetween, so that upon a vertical adjustment of plate 10 to the position of bricks under the lower bolts, the bricks above the last named bricks, would automatically fit under the upper bolts.

Once the bricks have been laid over the upper bolts, it will be possible to take off the retaining plate, leaving the threaded tips 14 of the bolts protruding out of the wall for reception of the meter box 21. A box of his type, as now made, includes a back wall provided with a plurality of holes located therein in such a spacing that the bolts 13 would readily fit into them. All that would be required to complete the mounting of the box would be to apply nuts 20 to the threaded ends of said bolts. A box 21 mounted upon the bolts in the above described manner, is shown in Fig. 5.

It will be understood that some minor changes may be made in the structure of my bracket without departing from the inventive concept disclosed herein. What I, therefore, wish to claim, is as follows:

1. A bracket for an electric meter box for use in a wall of a building, the bracket consisting of a vertical rectangular plate provided with a hole in each corner, the plate including a solid mid-portion and being provided with a plurality of long vertical slots spaced from each other, each of the slots extending from the mid-portion up to a point adjoining the upper rim of the plate, and with a plurality of vertical slots spaced from each other, each extending from the solid mid-portion to a point adjoining the lower rim of the plate, a separate bolt secured at one end within each corner hole of the plate and extending at right angle from the plate, each bolt having a threaded outer end, and a removable retaining plate having a plurality of holes to fit over the threaded ends of the bolts and being normally disposed in a spaced relation to the first-named plate, and nut means for application to the threaded ends of the bolts to keep said last-named plate in place.

2. A bracket for an electric meter box for installation in a wall, the bracket including a vertical rectangular plate provided with a hole in each corner and a plurality of long vertical slots in the upper portion of the plate, a plurality of long vertical slots in the lower portion, the slots in the upper portion being vertically alined with respective slots in the lower portion, a bolt at one end secured in each said hole, the other end of each bolt being threaded, a removable retaining plate having four holes therein in a spacing analogous to that of the spacing between the holes in the corners of the first-named plate, the holes being adapted to fit over the threaded ends of the bolts, the plate being disposed vertically in a spaced relation to the first-named plate, and nut means applicable to the threaded ends of the bolts to keep said last-named plate in place.

References Cited in the file of this patent

UNITED STATES PATENTS

| | | |
|---|---|---|
| 1,055,242 | Wagner | Mar. 4, 1913 |
| 1,334,749 | Gleockle, Jr. | Mar. 23, 1920 |